(12) United States Patent
Chin et al.

(10) Patent No.: US 8,611,933 B2
(45) Date of Patent: Dec. 17, 2013

(54) METHODS AND SYSTEMS FOR IDLE OPERATION IN MULTI-MODE MOBILE STATIONS

(75) Inventors: Tom Chin, San Diego, CA (US); Guangming Carl Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 603 days.

(21) Appl. No.: 12/369,719

(22) Filed: Feb. 11, 2009

(65) Prior Publication Data
US 2010/0202429 A1    Aug. 12, 2010

(51) Int. Cl.
*H04W 68/00* (2009.01)
*H04B 7/00* (2006.01)

(52) U.S. Cl.
USPC .......................................... 455/458; 455/515

(58) Field of Classification Search
USPC ................................ 455/458, 515
See application file for complete search history.

(56) References Cited

U.S. PATENT DOCUMENTS

| | | | |
|---|---|---|---|
| 6,826,400 B1 | 11/2004 | Cashman et al. | |
| 2006/0194598 A1 | 8/2006 | Kim et al. | |
| 2007/0238476 A1 * | 10/2007 | Sharma et al. | 455/515 |
| 2008/0261628 A1 * | 10/2008 | Proctor et al. | 455/458 |
| 2009/0197601 A1 * | 8/2009 | Kim et al. | 455/434 |

OTHER PUBLICATIONS

International Search Report & Written Opinion—PCT/US2010/023949, International Search Authority—European Patent Office—May 21, 2010.
Taiwan Search Report—TW099104499—TIPO—Jan. 10, 2013.

* cited by examiner

*Primary Examiner* — Kamran Afshar
*Assistant Examiner* — Omoniyi Obayanju
(74) *Attorney, Agent, or Firm* — Tyler J. Overall

(57) ABSTRACT

Certain embodiments of the present disclosure provide techniques for a multi-mode mobile station to establish paging intervals in different radio access technology (RAT) networks that do not collide.

20 Claims, 15 Drawing Sheets

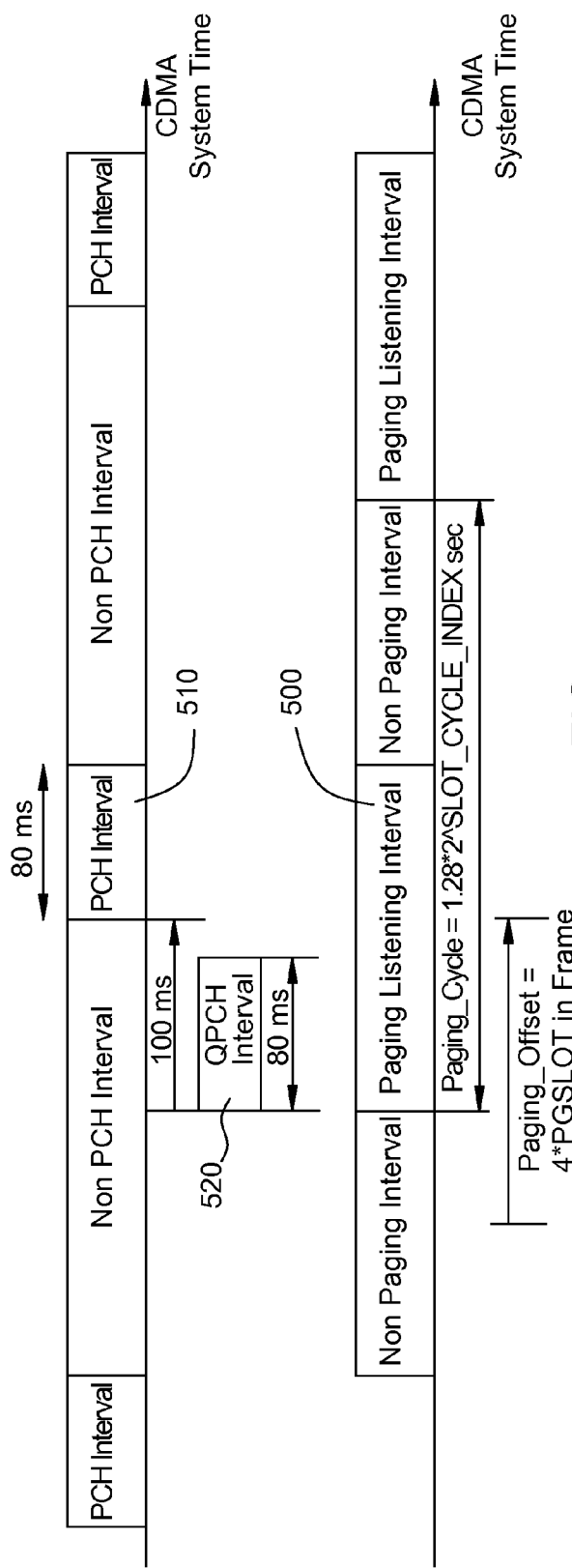
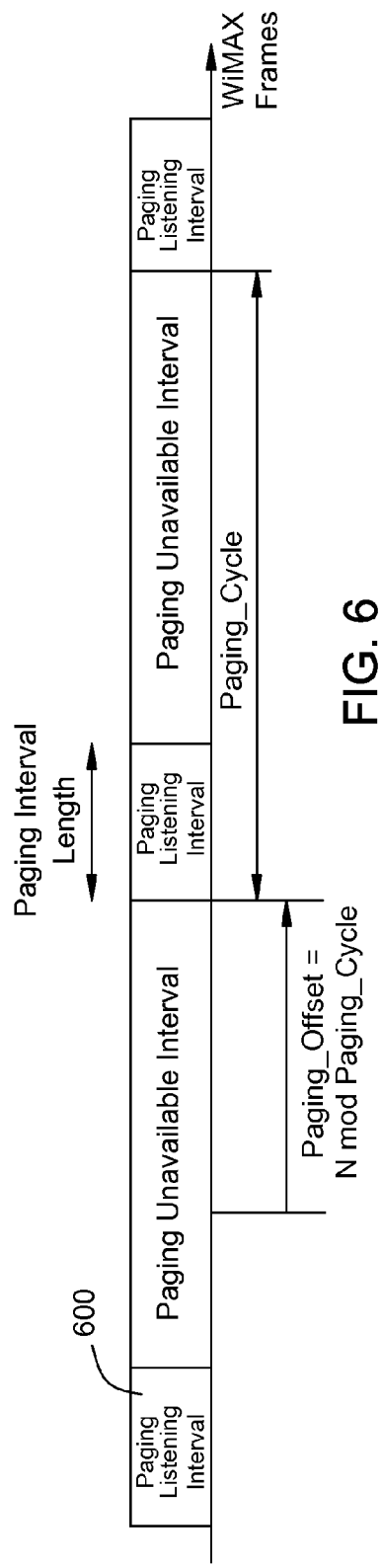
FIG. 5
FIG. 6

| Slot Cycle | Slots | CC Cycles | Sleep Period (sec) |
|---|---|---|---|
| 0 | 4 | 0.015625 | 0.006667 |
| 1 | 8 | 0.03125 | 0.013333 |
| 2 | 16 | 0.0625 | 0.026667 |
| 3 | 32 | 0.125 | 0.053333 |
| 4 | 64 | 0.25 | 0.106667 |
| 5 | 128 | 0.5 | 0.213333 |
| 6 | 256 | 1 | 0.426667 |
| 7 | 768 | 3 | 1.28 |
| 8 | 1536 | 6 | 2.56 |
| 9 | 3072 | 12 | 5.12 |
| 10 | 6144 | 24 | 10.24 |
| 11 | 12288 | 48 | 20.48 |
| 12 | 24576 | 96 | 40.96 |
| 13 | 49152 | 192 | 81.92 |
| 14 | 98304 | 384 | 163.84 |
| 15 | 196608 | 768 | 327.68 |

METHODS AND SYSTEMS FOR IDLE OPERATION IN MULTI-MODE MOBILE STATIONS

TECHNICAL FIELD

Certain embodiments of the present disclosure generally relate to wireless communication and, more particularly, to a multi-mode mobile stations entering into an idle mode.

SUMMARY

Certain embodiments provide a method for communicating, by a multi-mode mobile station (MS), with first and second networks via first and second radio access technologies (RATs). The method generally includes determining a first set of one or more paging parameters in an effort to establish a paging interval of the first network that does not conflict with a paging interval of the second network and communicating the first set of paging parameters to a base station of the first network in a request to establish the paging interval of the first network.

Certain embodiments provide an apparatus for communicating, by a multi-mode mobile station (MS), with first and second networks via first and second radio access technologies (RATs). The apparatus generally includes logic for determining a first set of one or more paging parameters in an effort to establish a paging interval of the first network that does not conflict with a paging interval of the second network and logic for communicating the first set of paging parameters to a base station of the first network in a request to establish the paging interval of the first network.

Certain embodiments provide an apparatus for communicating, by a multi-mode mobile station (MS), with first and second networks via first and second radio access technologies (RATs). The apparatus generally includes means for determining a first set of one or more paging parameters in an effort to establish a paging interval of the first network that does not conflict with a paging interval of the second network and means for communicating the first set of paging parameters to a base station of the first network in a request to establish the paging interval of the first network.

Certain embodiments provide a computer-program product for communicating, by a multi-mode mobile station (MS), with first and second networks via first and second radio access technologies (RATs), comprising a computer readable medium having instructions stored thereon, the instructions being executable by one or more processors. The instructions generally include instructions for determining a first set of one or more paging parameters in an effort to establish a paging interval of the first network that does not conflict with a paging interval of the second network and instructions for communicating the first set of paging parameters to a base station of the first network in a request to establish the paging interval of the first network.

In certain embodiments presented herein, such as those presented within these summary paragraphs, at least one of the first and second RATs includes a RAT in accordance with one or more standards of the Institute of Electrical and Electronics Engineers (IEEE) 802.16 family of standards.

In certain embodiments presented herein, such as those presented within these summary paragraphs, at least one of the first and second RATs includes a code division multiple access (CDMA) RAT.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 5 illustrates some of the components of a CDMA paging cycle.

FIG. 6 illustrates some of the components of a WiMAX paging cycle.

DETAILED DESCRIPTION

Figure 1:
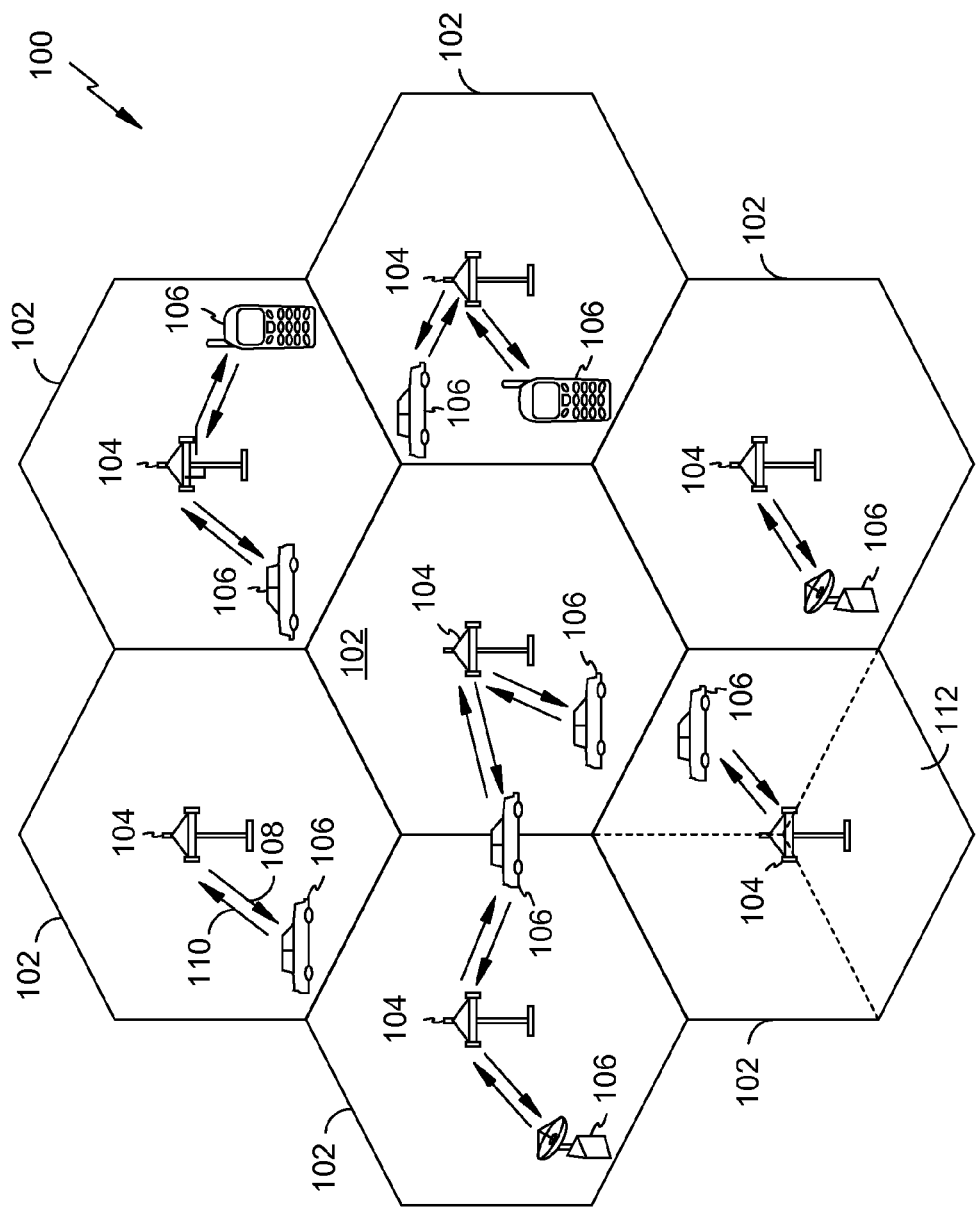
FIG. 1 illustrates an example wireless communication system, in accordance with certain embodiments of the present disclosure.

Orthogonal frequency-division multiplexing (OFDM) and orthogonal frequency division multiple access (OFDMA) wireless communication systems, such as those compliant with the IEEE 802.16 family of standards, typically use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

In order to expand the services available to subscribers, some MSs support communications with multiple radio access technologies (RATs). For example, a multi-mode MS may support WiMAX for broadband data services and code division multiple access (CDMA) for voice and data services.

As a result of supporting multiple RATs, there may be instances in which a multi-mode MS may be in idle mode in both the CDMA and the WiMAX networks. This may require the MS to listen for paging messages in both networks. Unfortunately, a multi-mode MS with a single RF chain may only listen to one system at a time.

Embodiments of the present disclosure may allow a multi-mode mobile station (MS) to, for example, supporting both WiMAX and a CDMA radio access technologies (RATs) to configure a paging cycle of one of the RATs in such a way as to avoid conflicts between the paging intervals of the RATs. Specifically, embodiments may provide a method and apparatus allowing a multi-mode MS to determine a paging cycle and paging offset of a first RAT and configure a duration of a paging cycle and a paging offset of a second RAT such that the paging interval of the second RAT does not conflict with the paging interval of the first RAT.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
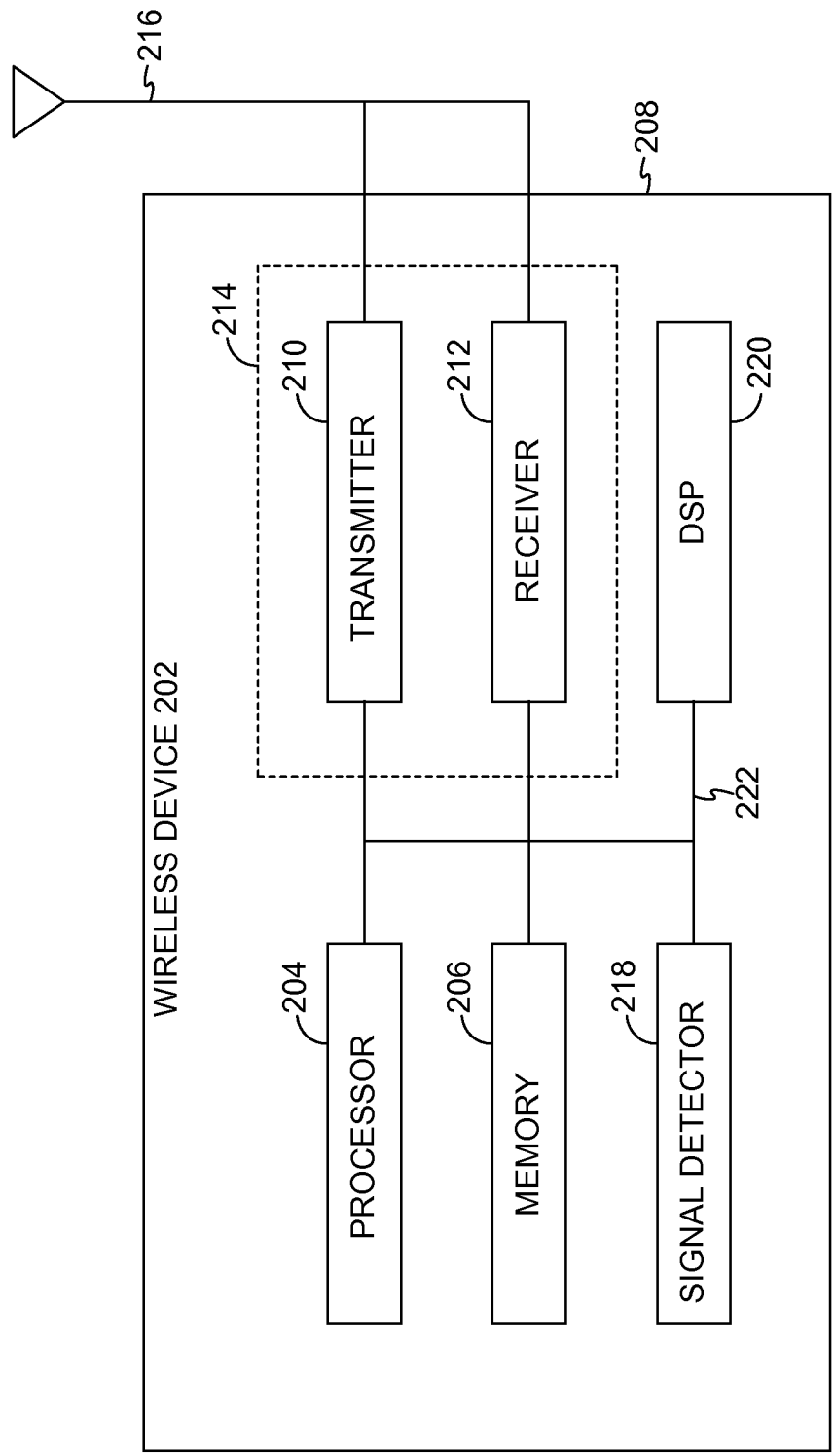
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
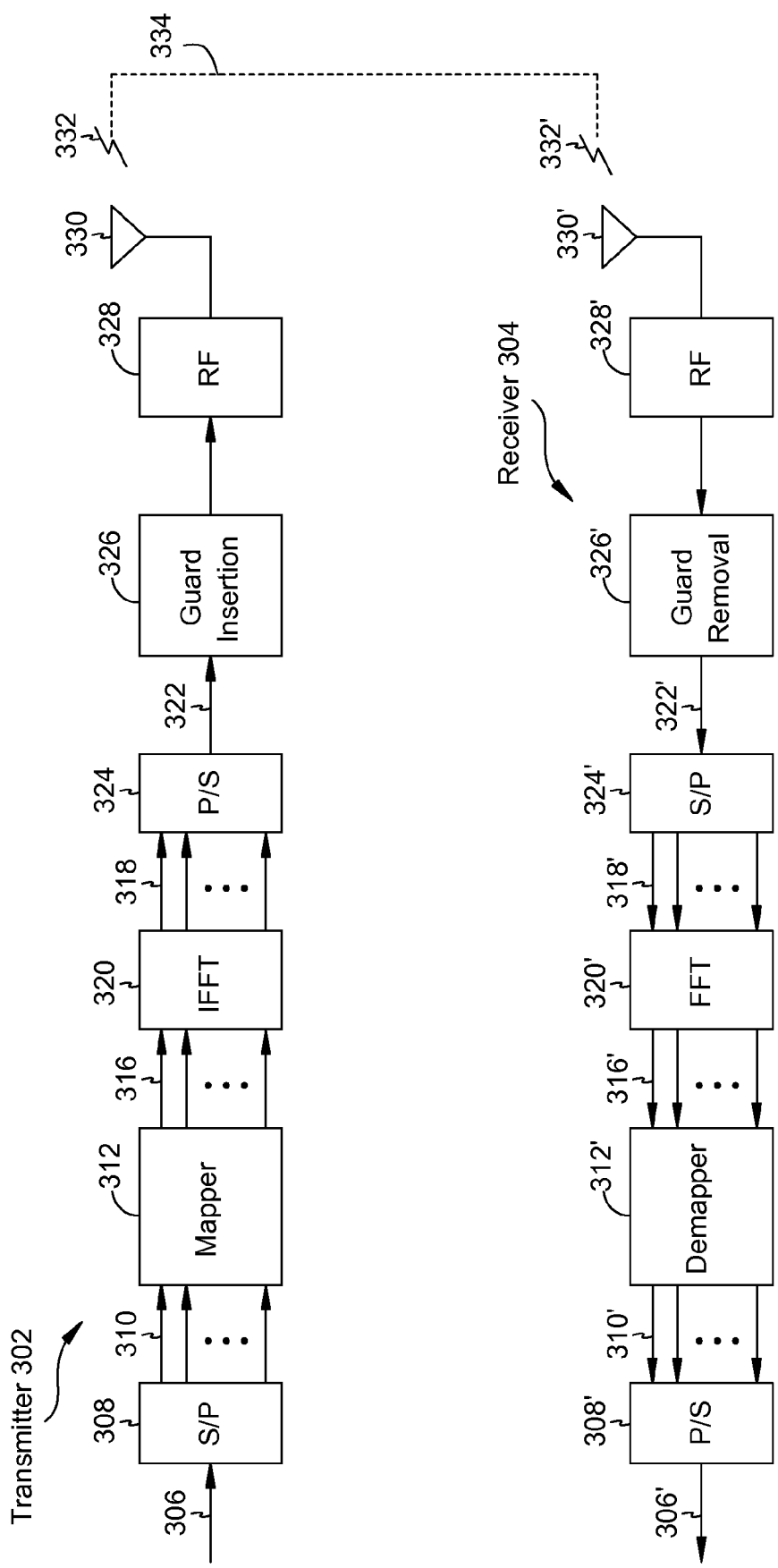
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Idle Mode Operation for Multi-Mode Mobile Stations

As previously mentioned, in the deployment of wireless services, a mobile device may support different radio access technologies (RATs) to provide an end user access to multiple services. For example, a multi-mode MS may support WiMAX for broadband data services and code division multiple access (CDMA) for voice and data services. This may result in instances in which the multi-mode MS may be in idle mode in both the CDMA and the WiMAX networks, requiring the MS to listen for paging messages in both networks.

Unfortunately, a multi-mode MS with a single RF chain may only listen to one system at a time, and there is also a very low probability that the CDMA and WiMAX networks are naturally configured so as to prevent an overlap of their respective paging intervals. Consequently, there may be instances in which a conventional MS with a single RF chain may miss one or more paging intervals of at least one of its supported networks due to a conflict between the paging intervals of said networks.

Moreover, there are at least two distinct RATs that employ a CDMA channel access method. For example, some voice services may employ a CDMA "1 times radio transmission technology," or CDMA 1x technology, while other voice and data services may employ a CDMA "Evolution-Data Optimized" technology, or CDMA EVDO technology. Unfortunately, the 1x and EVDO technologies differ with respect to idle mode parameters available for negotiation between the MS and corresponding BS. The consequences of these differences will be elaborated on later in the disclosure.

However, embodiments of the present disclosure may enable a multi-mode MS to configure a paging cycle between the MS and one or more of the RATs such that the paging intervals of one RAT do not conflict with the paging intervals of other supported RATs.

Figure 4:
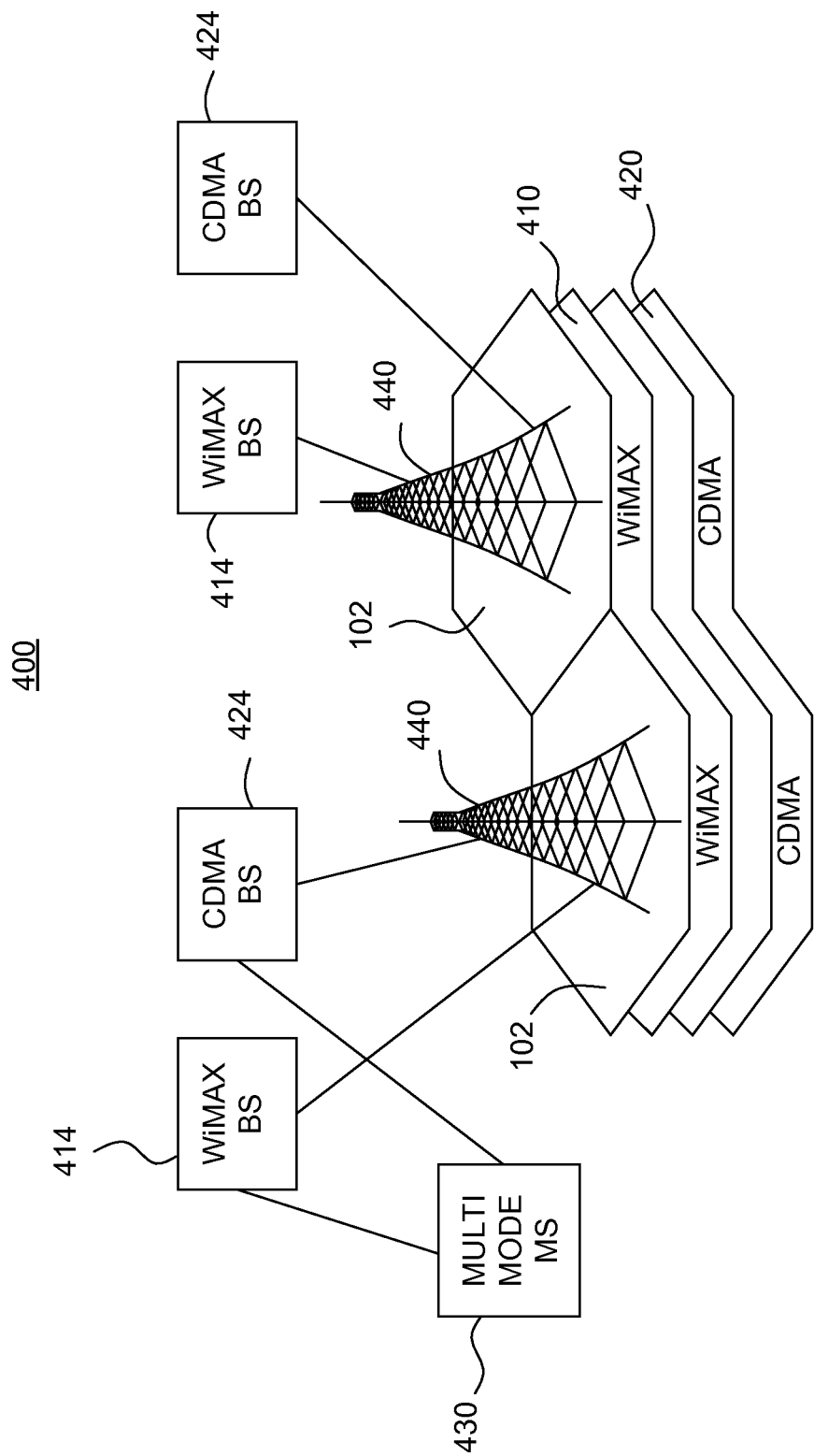
FIG. 4 illustrates an example WiMAX network overlaid on a code division multiple access (CDMA) 1x network.

FIG. 4 illustrates an example system 400 in which a synchronous mobile WiMAX network 410 may be combined with (or "overlaid" on) a CDMA network 420 to provide both broadband data and voice service.

FIG. 4 further illustrates that CDMA service may be provided to a geographic area by a plurality of hardware and software components. This geographic area may be divided into regions, referred to as cells, centered around a service tower 440. In an attempt to increase spatial efficiency, a single service tower 440 may support multiple RATs. For example, a service tower 440 may support both a WiMAX base station (BS) 414 as well as a CDMA BS 424.

Exemplary Multi-Mode Mobile Station in CDMA 1x and WiMAX Overlaid Network

In a synchronous WiMAX network 410, frame boundaries are synchronous among the plurality of base stations and the 24-bit frame numbers are also maintained among the plurality of base stations.

In the CDMA 1x network, as in the WiMAX network, an MS 430 in idle mode may listen to certain recurrent paging intervals. FIG. 5 illustrates a CDMA paging listening interval 500 which consists of listening to an 80 ms paging channel (PCH) interval 510 preceded by listening to a 100 ms quick paging channel (QPCH) interval 520. Accordingly, the MS 430 may need to listen for paging messages for a 180 ms time interval per paging cycle. Embodiments of the present disclosure may determine the beginning CDMA system time t of the PCH interval, in units of 20 ms frames, by employing Equation 1 and solving for t:

$$t \bmod [64*2^{SLOT\_CYCLE\_INDEX}] = \text{Paging\_Offset}_{CDMA}, \quad (1)$$

where the Paging_OffsetCDMA may be described as four times a PGSLOT value which is a function of International Mobile Subscriber Identity (IMSI). In Equation 1, the function "mod" or x modular y is defined by the remainder of x divided by y. However, to account for the QPCH, the MS may begin to listen for paging messages five frames prior to t.

Additionally, the above parameter SLOT_CYCLE_INDEX may be any integer value between 0 and 7 and may be used by the MS 430 to determine the length of a paging cycle, where the paging cycle consists of a paging listening interval 500 and a non-paging interval. Specifically, the MS may select a SLOT_CYCLE_INDEX and employ it in the application of Equation 2:

$$\text{Paging\_Cycle} = 1.28 * 2^{SLOT\_CYCLE\_INDEX} (\sec), \quad (2)$$

to determine the length of the paging cycle. However, it should be noted that the CDMA BS 424 may limit the maximum value of the SLOT_CYCLE_INDEX by broadcasting the maximum of SLOT_CYCLE_INDEX in a System Parameter Message.

Similar to the MS 430 in the CDMA 1x network 420, an MS 430 in an idle mode of the WiMAX network 410 may listen for paging messages in certain recurrent paging intervals, as illustrated in FIG. 6. However, unlike with CDMA 1x networks, the IEEE 802.16 standard does not provide for a quick paging channel in a WiMAX network 410. Accordingly, after determining the start of the BS broadcast page advertisement (MOB_PAG-ADV) message from WiMAX frame number N, as described by Equation 3:

$$N \bmod [\text{Paging\_Cycle}] = \text{Paging\_Offset}_{WiMAX}, \quad (3)$$

the MS 430 may not have to account for the QPCH. Instead, the duration of the paging listening interval 600 may be limited to a maximum of 5 frames subsequent to the frame number N.

Unfortunately, the current IEEE 802.16 standard limits the MS 430 such that the MS 430 may only propose a paging cycle to a WiMAX BS via a deregistration request (DREG-REQ). It may be left to the WiMAX BS to assign a paging offset, paging interval length, and paging cycle to an MS 430, via a deregistration command (DREG-CMD), prior to the MS entering an idle mode.

Certain embodiments of the present disclosure, however, may provide an enhanced DREG-REQ which may enable the MS 430 to include a 16-bit paging offset with the paging cycle, as well as, a bit flag indicating whether or not the WiMAX BS may alter the proposed parameters. This may allow the MS 430 to configure the WiMAX paging interval in such a way as to prevent a conflict between a WiMAX paging listening interval 600 and a CDMA 1x paging listening interval 500. By preventing conflict between the WiMAX paging listening interval 600 and the CDMA 1x paging listening interval 500, a multimode MS 430 with a single RF chain may be able to successfully listen to the paging listening intervals in both systems.

Figure 7:
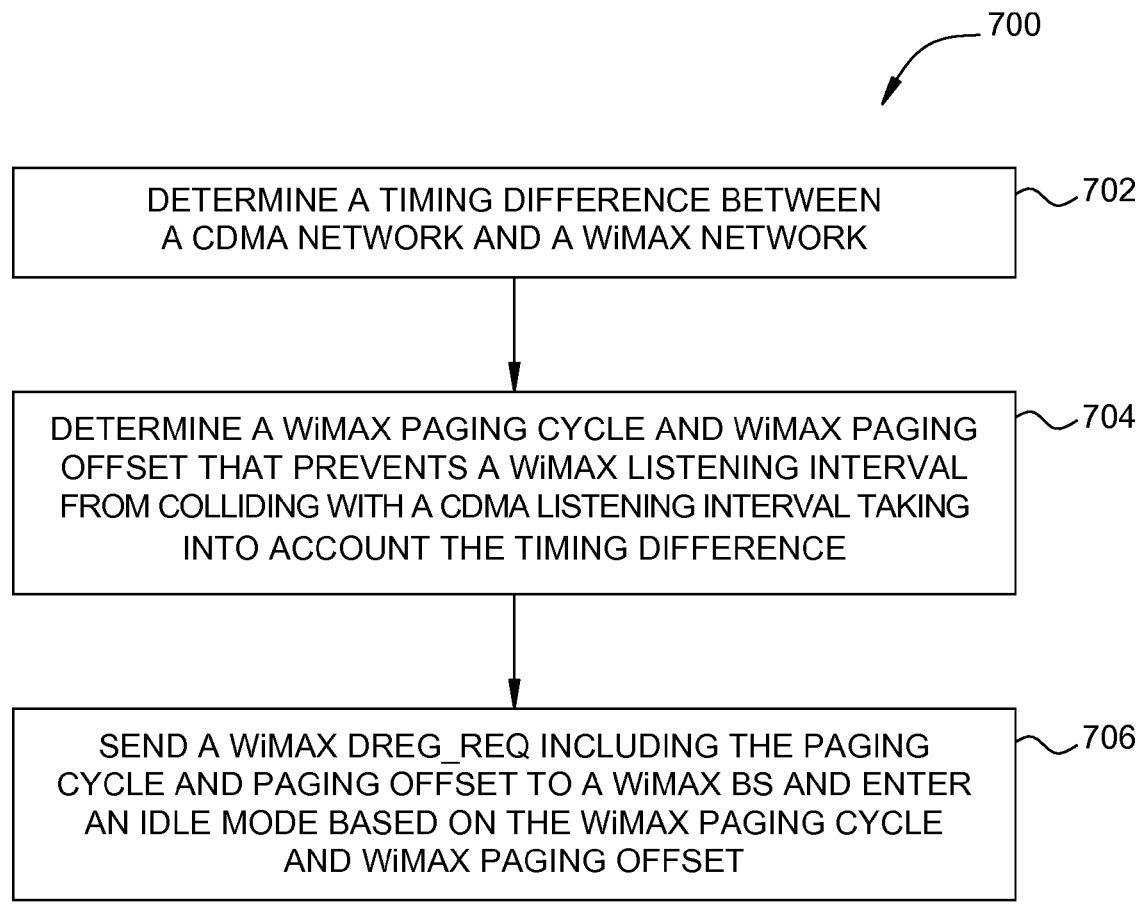
FIG. 7 illustrates example operations for configuring a WiMAX paging interval.

FIG. 7 illustrates example operations 700 that may be performed, for example, by a multi-mode MS 430, for configuring a WiMAX paging cycle in such a manner as to allow the MS 430 to listening to both a CDMA 1x RAT and a WiMAX RAT with a single RF chain, in accordance with certain embodiments of the present disclosure. The operations 700 may be performed, for example, by an MS in an effort to allow the MS to monitor the paging listening intervals of both RATs without conflict.

Figure 8:
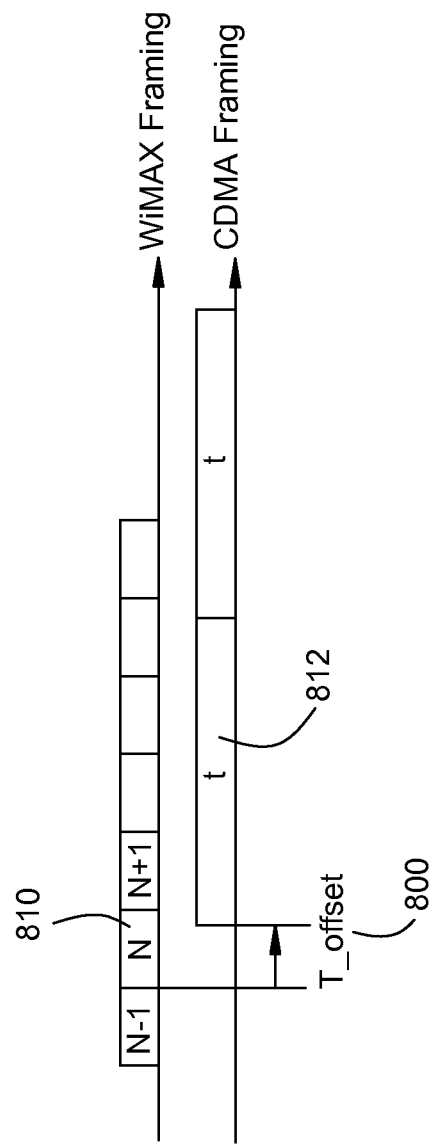
FIG. 8 illustrates a timing offset between WiMAX framing and CDMA 1x framing.

Operations begin, at 702, with the multi-mode MS 430 measuring a timing offset between the start of a WiMAX frame and the start of a CDMA frame. Such an offset is shown in FIG. 8 as T_offset 800 between the start of an arbitrary WiMAX frame with frame number N 810 and the start of the corresponding CDMA frame with CDMA system time (in frame number) t 812. To measure the CDMA frame timing, the MS 430 may require a scanning interval in which to switch from the WiMAX network to the CDMA network. While measuring the timing offset, the multi-mode MS 430 may also determine the WiMAX frame number and the CDMA system time in CDMA frames. It should be noted that a WiMAX frame (T_wm_frame) may have a shorter duration than a CDMA frame. For example, a traditional CDMA frame may have a duration of 20 milliseconds while a comparable WiMAX frame may be 5 milliseconds.

At 704, the multi-mode MS 430 may determine a set of WiMAX parameters (e.g., a paging cycle and paging offset), based on the previously calculated timing offset, that prevents a collision between the WiMAX listening interval and the CDMA listening interval.

At 706, having determined the set of WiMAX paging parameters, the MS 430 may send a DREG-REQ message to schedule a WiMAX paging cycle such that the WiMAX paging intervals 600 do not conflict with the paging intervals of a CDMA 1x network. According to some embodiments of the present disclosure, the DREG-REQ may contain the set of WiMAX paging parameters (e.g., the paging cycle and paging offset).

Subsequently, the MS 430 may enter an idle mode and wake-up and listen to the appropriate network according to the paging schedules of both networks. The MS 430 may also wake-up early and tune to whichever network's paging interval is about to begin in order to tune the RF chain and decode the paging messages in the paging interval.

In order to establish a WiMAX listening interval that does not collide with the CDMA listening interval, the MS may utilize information from previous exchanges with the CDMA 1x network 420. For example, from these exchanges, the MS 430 may know the CDMA 1x paging cycle parameter SLOT_CYCLE_INDEX. From the SLOT_CYCLE_INDEX the MS 430 may employ Equation 4:

$$(\text{PAGING\_CYCLE})_{CDMA\_1x} = \left(\frac{1.28 \sec}{\text{wmx\_frame}}\right) * 2^{SLOT\_CYCLE\_INDEX}, \quad (4)$$

to determine a duration of a CDMA 1x paging cycle, in number of WiMAX frames.

Embodiments of the present disclosure suggest configuring the WiMAX paging cycle such that the period of the WiMAX paging cycle is either a multiple of the CDMA 1x paging cycle, is evenly divisible into the CDMA 1x paging cycle, or is equal to the CDMA 1x paging cycle. Equations 5a-c:

$$(\text{PAGING\_CYCLE})_{WiMAX} = K * (\text{PAGING\_CYCLE})_{CDMA\_1x}, \quad (5a)$$

$$(\text{PAGING\_CYCLE})_{WiMAX} = \frac{(\text{PAGING\_CYCLE})_{CDMA\_1x}}{L}, \text{ or} \quad (5b)$$

$$(\text{PAGING\_CYCLE})_{WiMAX} = (\text{PAGING\_CYCLE})_{CDMA\_1x}, \quad (5c)$$

may describe the three suggested relationships, where K and L are positive integers which may take into account other WiMAX idle mode operations. For example, in certain embodiments K and L may depend on delays in receiving downlink (DL) data, power savings considerations, etc. Also, note that in an ideal embodiment L may be evenly divisible into the CDMA 1x paging cycle.

After registering with a CDMA network, the MS 430 may know the values of a set of CDMA 1x paging offset parameters. Accordingly, in certain embodiments the MS 430 may employ Equation 6:

$$D = \frac{20 \text{ ms}}{\text{wmx\_frame}} * M - \frac{100 \text{ ms}}{\text{wmx\_frame}} \quad (6)$$

where $M = (4*PGSLOT-t) \mod 64 * 2^{Slot\_Cycle\_Index}$, to determine an offset D, in WiMAX frames, between a WiMAX reference point N 810 and the start of the next CDMA 1x paging interval 510. In some embodiments, M may be interpreted to represent the number of CDMA frames which may pass between a timing reference time t and the start of an upcoming CDMA 1x PCH paging interval.

After determining a WiMAX paging cycle and the offset D between a WiMAX reference point N 810 and the start of the CDMA 1x PCH paging interval, the MS 430 may determine a WiMAX paging offset that enables the WiMAX paging interval 600 to avoid conflict with CDMA 1x paging interval 500. To determine the WiMAX paging offset, embodiments of the present disclosure may employ one or more of a plurality of equations to account for a specific relationship between a period of the WiMAX paging cycle and a period of the CDMA 1x paging cycle.

Figure 9A:
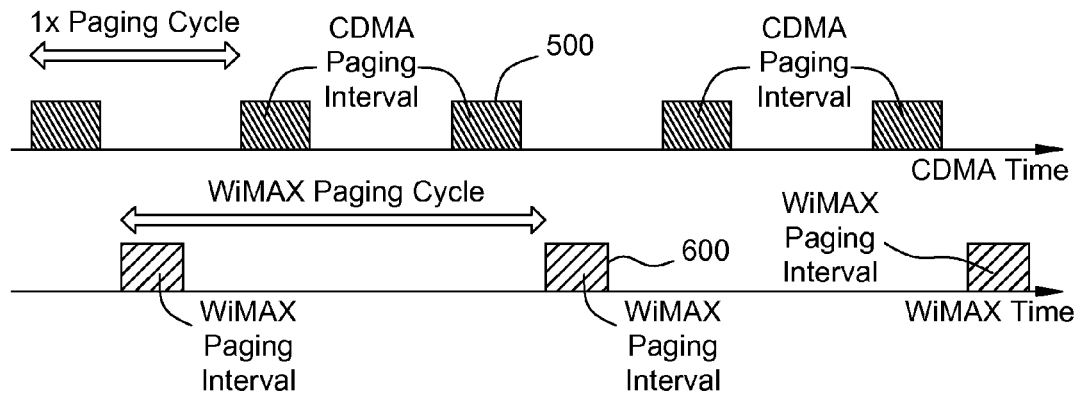
FIGS. 9A-C illustrate configurations of WiMAX paging cycles such that conflict is avoided with CDMA paging intervals.

For example, FIG. 9A illustrates an instance in which the period of the WiMAX paging cycle is a multiple K of the period of the CDMA 1x paging cycle. In the present example, the period of the WiMAX paging cycle is twice as long as the period of the CDMA 1x paging cycle (i.e., K=2). Traditionally, a WiMAX paging offset could have a range of values equal to the number of frames in a WiMAX paging cycle. However, the MS 430 is trying to select a WiMAX paging offset such that the WiMAX paging interval does not conflict with the CDMA 1x paging interval.

Accordingly, embodiments of the present disclosure may utilize this idea in determining a set of WiMAX offset values A. In instances in which the period of the WiMAX paging cycle is a multiple K of the period of the CDMA 1x paging cycle, the set of WiMAX offset values A from which the MS 430 may select may be described by Equation 7:

$$A = \{u + v * P\} \quad (7)$$

where u is a subset of paging offset values A0, described below, v is a set of number ranging from 0 to K−1, inclusively, and P is the minimum of WiMAX paging cycle and CDMA 1x paging cycle, described in Equation 9.

In certain embodiments, the subset of paging offset values A0 may be described by Equation 8:

$$A_0 = \{i \mod P, (i+1) \mod P, (i+2) \mod P, \ldots, j \mod P\}, \quad (8)$$

where P is described in Equation 9, i is a starting number, and j is an ending number. Certain embodiments, may determine P by employing Equation 9:

$$P = \text{PAGING\_CYCLE}_{WiMAX}/K. \quad (9)$$

Additionally, embodiments may determine the starting number i and the ending number j by employing Equations 10 and 11, respectively:

$$i = N + D + \frac{180 \text{ ms}}{\text{wmx\_frame}} + 1 + \\ \text{CEILING}[\max(\text{T\_tune}_{wmx}, 1 - \text{T\_offset}) - (1 - \text{T\_offset})] \quad (10)$$

$$j = N + D - 5 - \text{CEILING}[\max(\text{T\_tune}_{CDMA\_1x}, \text{T\_offset}) - \text{T\_offset}]. \quad (11)$$

Note that Equation 11 may have a '−5' term. This term accounts for the WiMAX paging interval 600 which may be up to 5 frames. Additionally, T_tuneCDMA_1x represents the time an MS 430 may require to tune to the CDMA 1x network before decoding a CDMA 1x paging signal. Similarly, T_tunewmx represents the time an MS 430 may require to tune to the WiMAX network before decoding a WiMAX paging signal.

Figure 9B:
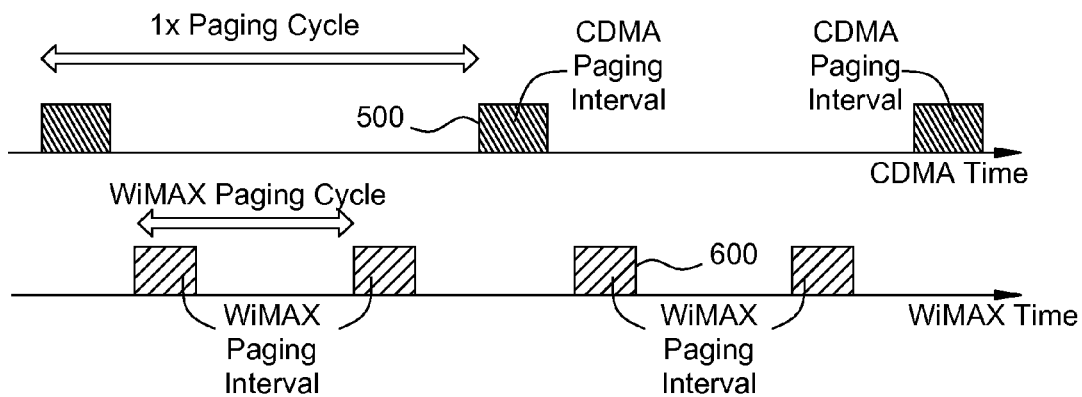

Additionally, in instances in which the period of the WiMAX paging cycle is evenly divisible into the CDMA 1x paging cycle, as illustrated in FIG. 9B, the set of WiMAX offset values A from which the MS 430 may select may be described by Equation 12:

$$A = \{i \mod P, (i+1) \mod P, (i+2) \mod P \ldots, j \mod P\}, \quad (12)$$

where P is described in Equation (13), i is a starting number, and j is an ending number. Certain embodiments, may determine P by employing Equation 13:

$$P = \text{PAGING\_CYCLE}_{WiMAX}. \quad (13)$$

Additionally, embodiments may determine the starting number i and the ending number j by employing Equations 10 and 11, respectively.

Figure 9C:
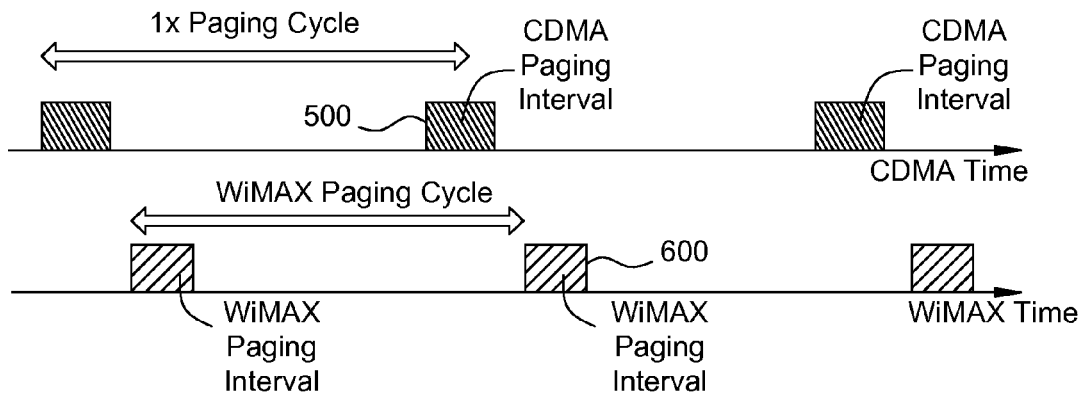

Moreover, in instances in which the period of the WiMAX paging cycle is equal to the CDMA 1x paging cycle, as illustrated in FIG. 9C, the set of WiMAX offset values A from which the MS 430 may select may be described by Equation 14:

$$A = \{i \mod P, (i+1) \mod P, (i+2) \mod P, \ldots, j \mod P\}, \quad (14)$$

where P is described in Equation (15), i is a starting number, and j is an ending number. Certain embodiments, may determine P by employing Equation 15:

$$P = \text{PAGING\_CYCLE}_{WiMAX}. \quad (15)$$

Additionally, embodiments may determine the starting number i and the ending number j by employing Equations 10 and 11, respectively.

In short, the MS 430 may choose a WiMAX paging offset value from a set of WiMAX offset values A, as described above, based on the configuration of the WiMAX paging cycle with respect to the CDMA 1x paging cycle. In certain embodiments, the WiMAX paging offset chosen from the set A may be the median number from the set. For example, an MS 430 may select a paging offset value of '4' from a set of WiMAX paging offset values A which includes the values {2, 3, 4, 5, 6}. However, the MS 430 may also select a paging offset from the beginning or end of the set. This may be done, for example, to concatenate paging intervals from two networks.

Figure 10:
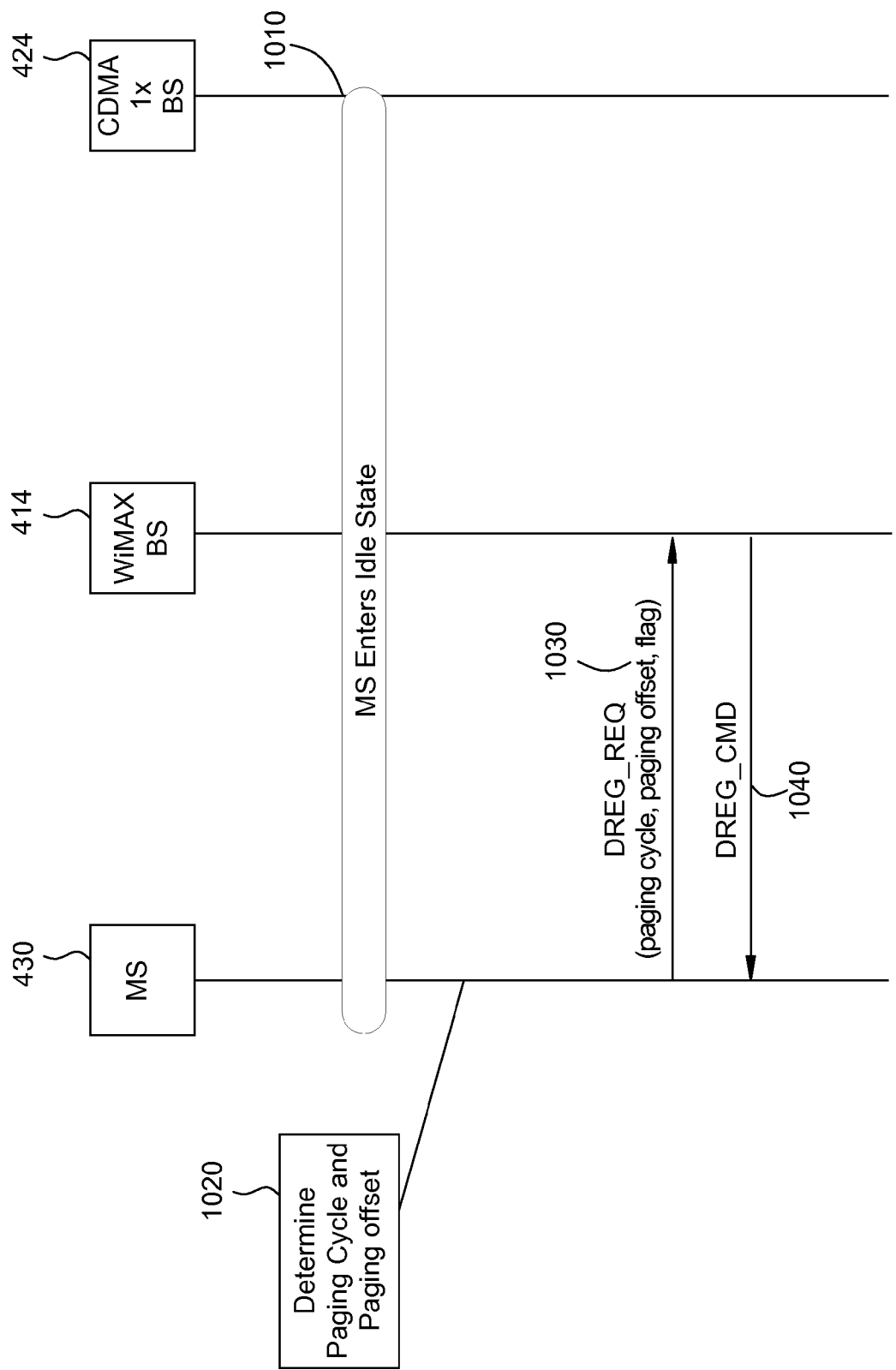
FIG. 10 illustrates example exchanges between a multi-mode mobile station and two base stations of differing radio access technologies

FIG. 10 summarizes the procedures that may take place between the MS 430, the CDMA 1x BS 424, and the WiMAX BS 414. The procedures begin when the MS 430 enters the idle state 1010 with the CDMA 1x BS 424, such as after the call disconnects. The MS 430 can establish a paging cycle with periodic CDMA 1x paging intervals 500.

The MS 430 may then, at 1020, determine a set of WiMAX paging parameters (e.g., a paging cycle and paging offset) so that the WiMAX paging intervals 600 do not conflict with the established CDMA 1x paging intervals 500. It should be noted that the methods and procedures associated with determining the WiMAX paging cycle and WiMAX paging offset may correspond with the operations described at 704.

After determining a set of WiMAX paging parameters such that the WiMAX paging intervals 600 do not conflict with the CDMA 1x paging intervals 500, the MS 430 may send a DREG-REQ 1030 to the WiMAX BS 414 including the set of WiMAX paging parameters. Additionally, the DREG-REQ, in accordance with some embodiments, may include a flag indicating the mandatory or optional nature of the WiMAX paging parameters. In response, the WiMAX BS 414 may send a DREG-CMD 1040 confirming the DREG-REQ of the MS 430.

The MS 430, now in an idle mode with respect to both the CDMA 1x network and the WiMAX network, may wake-up in accordance with the paging cycles of both networks. Additionally, it may be possible for the MS 430 to wake-up and detect a change with respect to a serving BS. In this case, the MS 430 may need to stay with the new BS without switching over to listen to the paging interval of the other network. This may be done in order to acquire the new system overhead information, namely a System Parameter Message in the CDMA network or a Downlink Channel Descriptor (DCD) and an Uplink Channel Descriptor (UCD) in the WiMAX network. After acquiring the new system overhead information, the MS 430 may resume the regular dual paging interval schedules of the CDMA 1x and WiMAX networks.

It should also be noted that embodiments of the present disclosure may not interfere with the MS 430 maintaining all of the registration or location update performance requirements in the CDMA and WiMAX networks. For example, if a periodic registration timer has expired, the MS 430 may immediately switch to the other network, if needed, to perform registration while suspending the dual paging schedules. However, after the registration is complete, the dual paging listening intervals may resume.

Exemplary Multi-Mode Mobile Station in CDMA EVDO & WiMAX Overlaid Network

As previously described, there are at least two distinct RATs that employ a CDMA channel access method. Previously described embodiments addressed an environment in which a CDMA 1x network is overlaid on a synchronous WiMAX network. In the 1x network, the standard limited what paging parameters an MS was allowed to suggest.

However, EVDO technologies differ with respect to idle mode parameters available for negotiation between the MS and corresponding BS. Under the EVDO standard, the MS 430 may select a control channel cycle (CCC) which may enable the MS to configure the CDMA EVDO paging cycle in such a way as to avoid conflict between EVDO paging intervals and WiMAX paging intervals.

Again, it is important to note that in a synchronous WiMAX network 410, the frame boundaries are synchronous among the plurality of base stations and the 24-bit frame numbers are identical among the plurality of base stations at the same time.

Figures 11A, 11B:
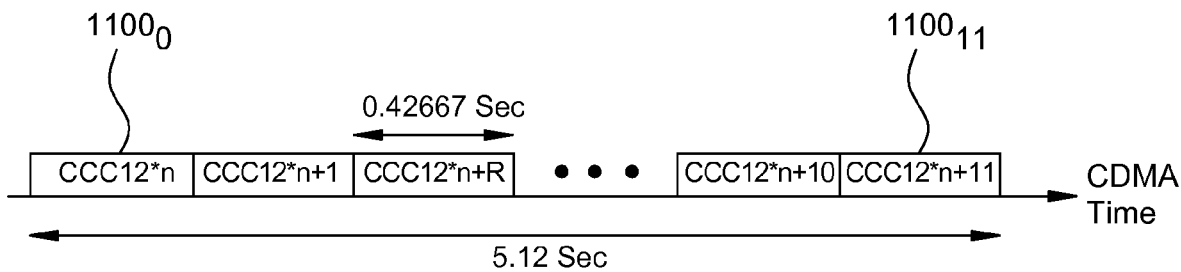
FIGS. 11A-B illustrate components of a CDMA EVDO control channel cycle.

Under current CDMA EVDO standards, an MS 430 in a slotted idle mode may listen to a certain CCC. Each CCC lasts approximately 426.67 ms and is divided into 256 slots, each of 1.67 ms. In EVDO rev 0, the idle state protocol may allow the MS 430 to wake-up for one control channel cycle every 5.12 seconds, where 12 CCCs 11000-11 are available during 5.12 seconds, as illustrated in FIG. 11A. Additionally, each CCC has an index starting from the beginning of the CDMA system time. An MS 430, in a CDMA EVDO network may wake-up on a CCC with index C where the value of C satisfies Equation 16:

$$(C+R) \bmod 12 = 0, \qquad (16)$$

where the parameter 'R' may be set by either a random generation algorithm specified in the CDMA standard or an MS preferred value, called a Preferred CCC.

Under EVDO rev 0, an MS 430 may choose one of the previous two options by setting a Preferred CCC enable parameter. If the MS 430 decides to set the Preferred CCC, the MS 430 may use a generic configuration protocol in an EVDO configuration request message. However, under CDMA EVDO rev A, an enhanced idle mode protocol may allow the MS 430 to sleep for one of a plurality of possible periods, as illustrated in FIG. 11B. The sleep period may range from 4 slots (or 1/64 of a CCC) to 196,608 slots (or 768 CCCs). Despite the available choices, in the interest of power consumption, embodiments of the present disclosure focus on sleep periods longer than 1 CCC (i.e., a slot cycle value greater than or equal to 7).

Additionally, CDMA EVDO rev A protocols allow an MS 430 to enter an idle mode with graduated sleep periods. For example, the MS 430 may have 3 sleep periods of different lengths. The first sleep period Period1 may be one CCC, or 426.67 milleseconds, the second sleep period Period2 may be three CCCs, or 1.28 seconds, and the third sleep period Period3 may be six CCCs, or 2.56 seconds. However, the Period3 may represent the final sleep period and will be used for reference for the remainder of the disclosure. Period3 is in units of CDMA EVDO slots.

CDMA EVDO rev A goes on to specify that an MS 430 may wake-up at a slot within a CCC described by Equation 17:

$$[T+256*R] \bmod \text{Period} = \text{Offset}. \qquad (17)$$

This is in fact equivalent to CCC index C satisfying Equation 16, where P=Period3/256. It should be noted that Period3 may be set properly under EVDO rev A.

Unfortunately, WiMAX, under the present IEEE802.16 standard, only provides the MS 430 with a means for suggesting a paging cycle when deregistering. However, as previously described, a CDMA EVDO network provides the MS 430 with the means to select a preferred CCC, enabling the MS 430 to configure the CDMA EVDO paging cycle such that EVDO paging intervals do not conflict with WiMAX paging intervals 600.

Figure 12:
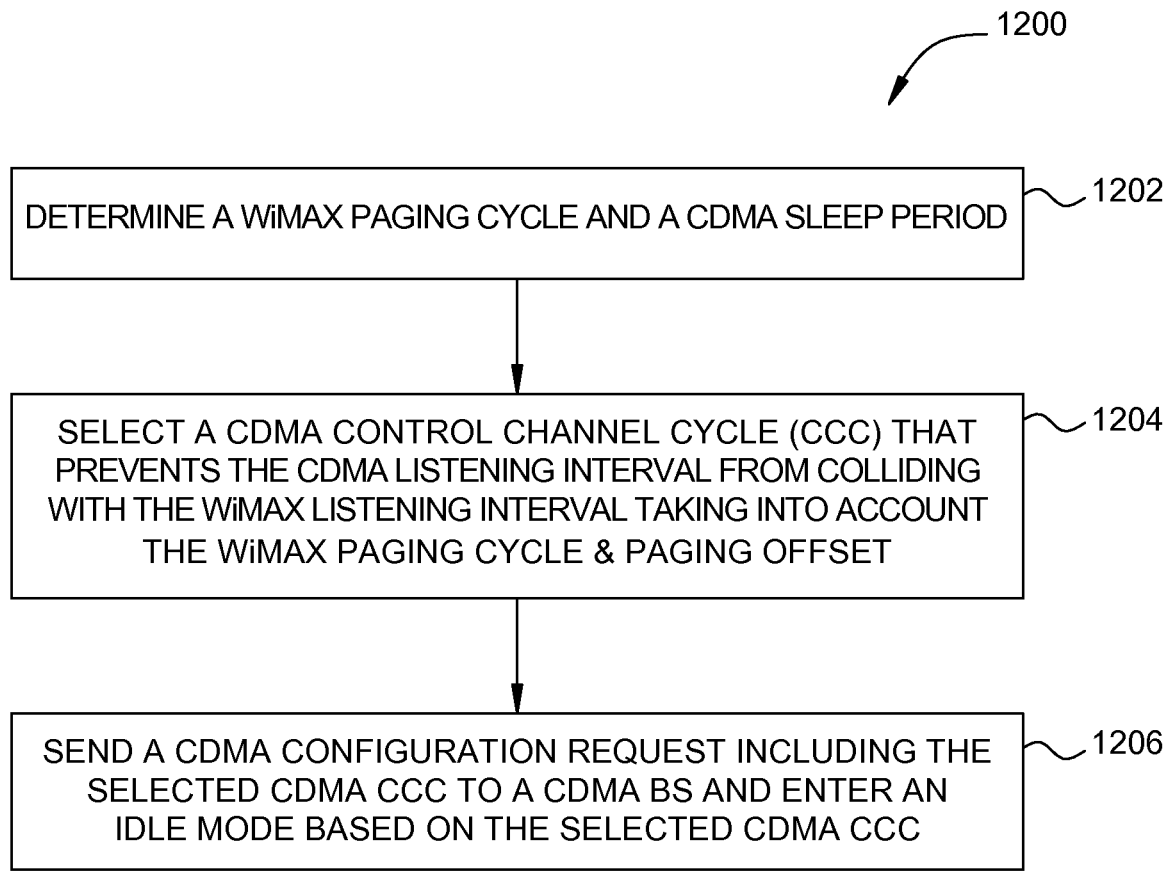
FIG. 12 illustrates example operations for configuring a CDMA EVDO paging interval.

FIG. 12 illustrates example operations 1200 that may be performed, for example, by a multi-mode MS 430, for configuring a CDMA EVDO paging offset in such a manner as to allow the MS 430 to listening to both a WiMAX RAT and a CDMA EVDO RAT with a single RF chain, in accordance with certain embodiments of the present disclosure. The operations 1200 may be performed, for example, by an MS in an effort to allow the MS to monitor the paging listening intervals of both RATs without conflict.

Operations begin, at 1202, with the multi-mode MS 430 determining a WiMAX paging cycle. Since, in the interest of power consumption, embodiments of the present disclosure focus on sleep periods longer than 1 CCC, a WiMAX paging cycle may be selected such that the period of the WiMAX paging cycle is an integer multiple m of 1.28 seconds, where 1.28 seconds is the duration of 3 CCCs (or the sleep period associated with a slot cycle value equal to 7th). Additionally, the Paging_Cycle field in DREG-REQ and DREG-CMD messages is in units of WiMAX frames. Accordingly, the integer multiple m may be described by Equation 18:

$$m = \frac{(PAGING\_CYCLE)_{WiMAX} * wmx\_frame}{1.28 \text{ sec}}. \quad (18)$$

Again, since embodiments of the present disclosure are focused on sleep periods longer than 1 CCC, it can be assumed that the MS 430 sleep period in the CDMA EVDO network can be described by Equation 19:

$$Sleep\_Period_{CDMA\_EVDO} = 1.28 * n, \quad (19)$$

where n is an integer of the set {1, 2, 4, 8 . . . }. More specifically, in embodiments utilizing an EVDO rev 0 network, n may equal 4, while in embodiments utilizing an EVDO rev A network, n may equal Period3/(256*3).

After determining a Paging_CycleWiMAX and deriving the corresponding integers m and n, the MS 430 may determine an integer k that represents the greatest multiple of 1.28 seconds that can evenly divide into both the CDMA EVDO sleep period and the WiMAX paging cycle. The integer k may be found by determining greatest common divider of m and n, as described by Equation 20:

$$k = \text{g.c.d.}\{m, n\}. \quad (20)$$

Note that the significance of k and the utilization thereof will be discussed later.

Figure 13:
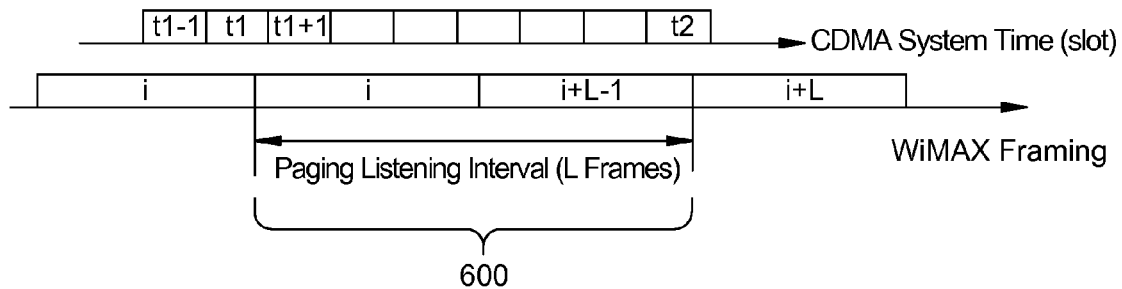
FIG. 13 illustrates a WiMAX listening interval referenced by CDMA slots.

After registering and joining both the WiMAX and CDMA EVDO networks, the MS 430 may know the CDMA system time in units of slots. Additionally, the MS 430 may know which CDMA EVDO slots are spanned by a WiMAX paging interval 600, as illustrated in FIG. 13. In the present example, the WiMAX paging interval 600 has a duration from 2-5 WiMAX frames. In turn, the WiMAX frames span CDMA slots t1 to t2, inclusively.

From determining the value of slots t1 and t2, the MS 430 may determine which CCCs are covered in whole or in part by the WiMAX paging interval 600. For example, the MS 430 may employ Equation 21:

$$CCC_{START} = \text{FLOOR}\left[\frac{(t1 - T\_tune_{wmx})}{256}\right], \quad (21)$$

to determine the first CDMA EVDO slot in which the MS should be in idle mode with respect to the CDMA EVDO network. The CCCSTART may be understood to represent a CCC index corresponding to a time T_tunewmx prior to the beginning of the WiMAX paging interval. Assuming the MS 430 must be tuned to the WiMAX network prior to the start of the WiMAX paging interval, it may be beneficial for the MS 430 to account for that tuning time when determining what CCCs are not eligible to be CDMA EVDO paging intervals.

Additionally, the MS may employ Equation 22:

$$CCC_{END} = \text{CEILING}\left[\frac{(t2 + T\_tune_{CDMA\_EVDO})}{256}\right], \quad (22)$$

to determine the last CDMA EVDO slot in which the MS should be in idle mode with respect to the CDMA EVDO network. The CCCEND may be understood to represent a CCC index after which the MS 430 may resume listening for a CDMA EVDO paging message. The CCC index CCCEND may be found at a time equal to the value of T_tuneCDMA_EVDO, subsequent to the end of the WiMAX paging interval. Assuming the MS 430 must tune back to the CDMA EVDO network prior to the start of the CDMA EVDO paging interval, it may be beneficial for the MS 430 to account for that tuning time when determining what CCCs are not eligible to be CDMA paging intervals.

Additionally, there are at least two more variables that may be determined, which may help in configuring a CDMA EVDO paging cycle such that the CDMA EVDO paging intervals do not conflict with WiMAX paging intervals 600. For example, a first variable kSTART may be defined by Equation 23:

$$k_{START} = CCC_{START} \mod(3*k), \quad (23)$$

where 3 is the number of control channel cycles corresponding to a sleep period of 1.28 seconds. A second variable kEND may be defined by Equation 24:

$$k_{END} = CCC_{END} \mod(3*k). \quad (24)$$

The variables kSTART and kEND may be utilized in defining one or more sets of CCCs from which the MS 430 may select one CCC to be a preferred CCC.

After determining the value of CCCSTART and CCCEND, the MS 430 may take one of two approaches in compiling a set A of CCCs from which the MS 430 may select one to be a preferred CCC. The first approach may be described as a relatively conservative approach wherein the set A may be described by Equation 25:

$$A = \{u + v*3*k\}. \quad (25)$$

In Equation 25, u may be understood to represent a subset A0, of CCCs from which the MS 430 could select a preferred CCC with a reduced chance of the conflicting with a WiMAX paging interval. This subset A0 is further described below. Additionally, v may be understood to be a set of numbers ranging from 0 to (n/k)−1. In said embodiments, the subset of potential preferred CCCs A0 may be described by Equation 26:

$$A_0 = \{W\}, \quad (26)$$

where w is a range of values spanning 0 to 3*k−1, excluding w=kSTART and w=kEND. By excluding the CCCs with a CCC index equal to kSTART or kEND, the MS 430 may be certain that it is tuned to the CDMA EVDO network prior to the beginning of the EVDO paging interval. Moreover, the MS 430 may also be certain that it is tuned to the WiMAX network prior to the beginning of the WiMAX paging interval.

In contrast, after determining the value of CCCSTART and CCCEND, the MS 430 may take a more aggressive approach in populating the subset A0 and assume there is a very low probability that the end of the CCC with index CCCSTART may have a CDMA EVDO page message. Accordingly, the MS 430 may begin tuning to the WiMAX network prior to the conclusion of the CDMA EVDO paging interval. While this approach may, in certain instances, result in additional idle mode time for the MS 430, there is the remote possibility that the MS 430 would miss a page from the CDMA EVDO network when the MS switches to the WiMAX network early.

To employ the more aggressive approach, the MS 430 would still apply Equations 23 and 24; however, the subset of potential CCCs A0 would only exclude the CCC with a CCC index equal to kEND.

Once the MS 430 has determined a Preferred CCC, the MS 430 may send the CDMA EVDO BS a configuration request message including the Preferred CCC, as illustrated at 1206.

Figure 14:
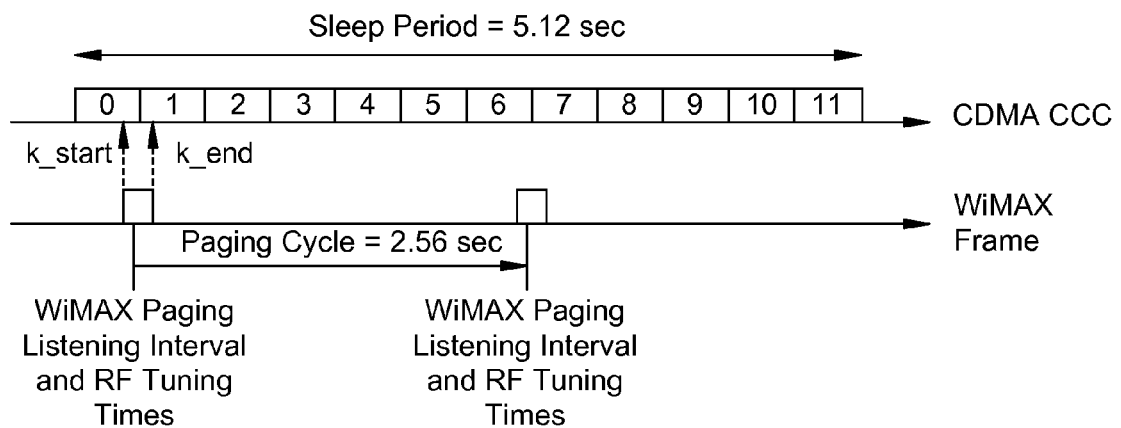
FIG. 14 illustrates an example CDMA EVDO configuration to avoid conflict with WiMAX paging intervals.

FIG. 14 illustrates how the operations shown in FIG. 12 may help establish a CDMA paging interval that avoids collisions with WiMAX paging intervals. In the illustrated example, a WiMAX paging cycle of 2.56 seconds is assumed. By applying Equation 20, the value of m is determined to be 2. Next, the EVDO sleep period is shown to be 5.12 seconds, or 12 CCCs. From this, the integer value n equal to 4 can be derived. Taking the greatest common divisor k of the set {m,n}, k equal to 2 can be derived.

By examining FIG. 14, it may be seen that the CCCSTART value is 0 and the CCCEND value is 1. From this kSTART can be determined to equal 0 and kEND can be determined to equal 1. By applying kSTART and kEND to the population of the subset A0 and utilizing the conservative approach, a subset A0 is populated with CCCs {2, 3, 4, 5}. With the subset A0 and the value k, a complete set A is populated with CCCs {2, 3, 4, 5, 8, 9, 10, 11}. In contrast, if it is assumed that at the end of CCC=0 or 6 there is little probability of receiving a paging message, a subset A0 is populated with CCCs {0, 2, 3, 4, 5} and a complete set A is populated with CCCs {0, 2, 3, 4, 5, 6, 8, 9, 10, 11}.

Figure 15:
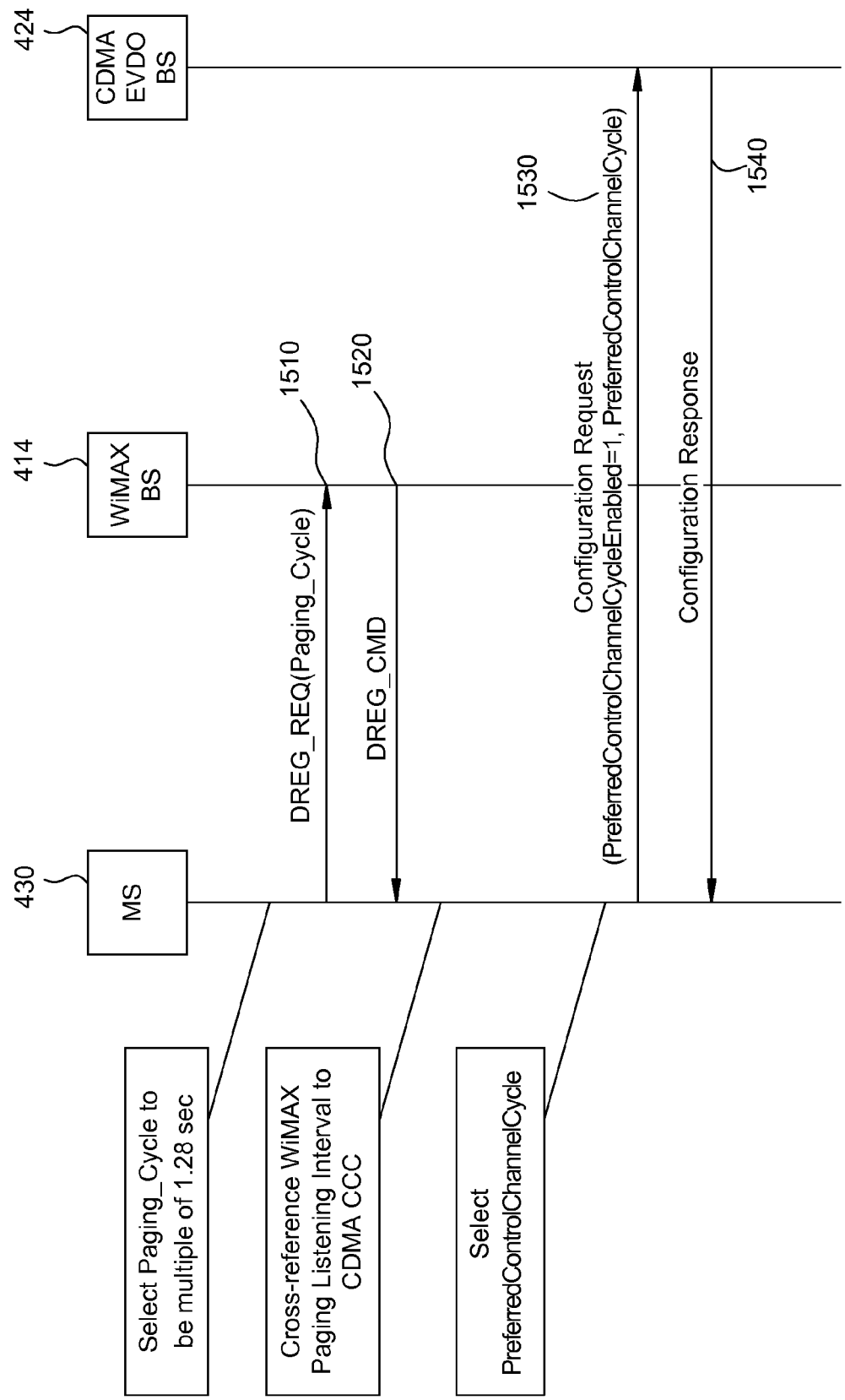
FIG. 15 illustrates example exchanges between a multi-mode mobile station and two base stations of differing radio access technologies.

FIG. 15 illustrates the MS 430 establishing a WiMAX paging cycle (by sending a DREG-REQ 1510 including the WiMAX paging cycle and receiving a DREG-CMD 1520) and then configuring the CDMA EVDO paging cycle such that the EVDO paging intervals do not conflict with the WiMAX paging intervals.

Figure 7A:
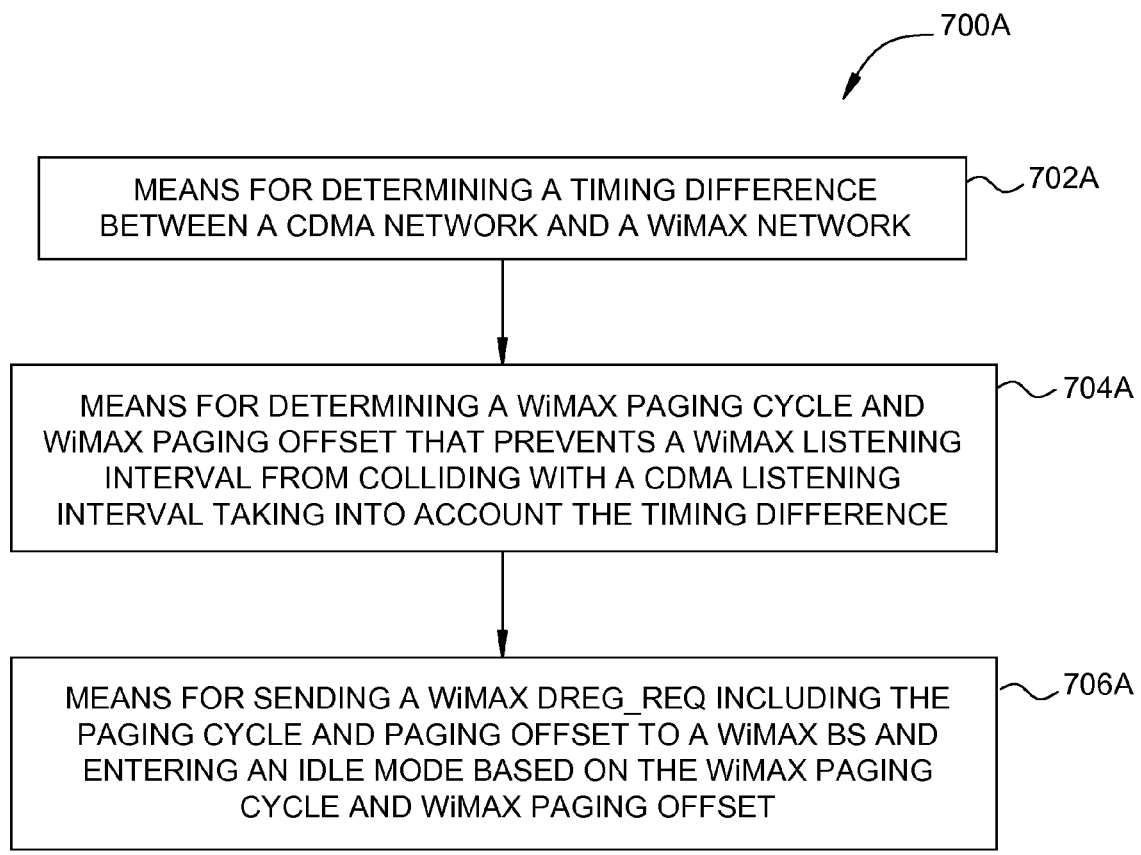
FIG. 7A is a block diagram of means corresponding to the example operations of FIG. 7.
Figure 12A:
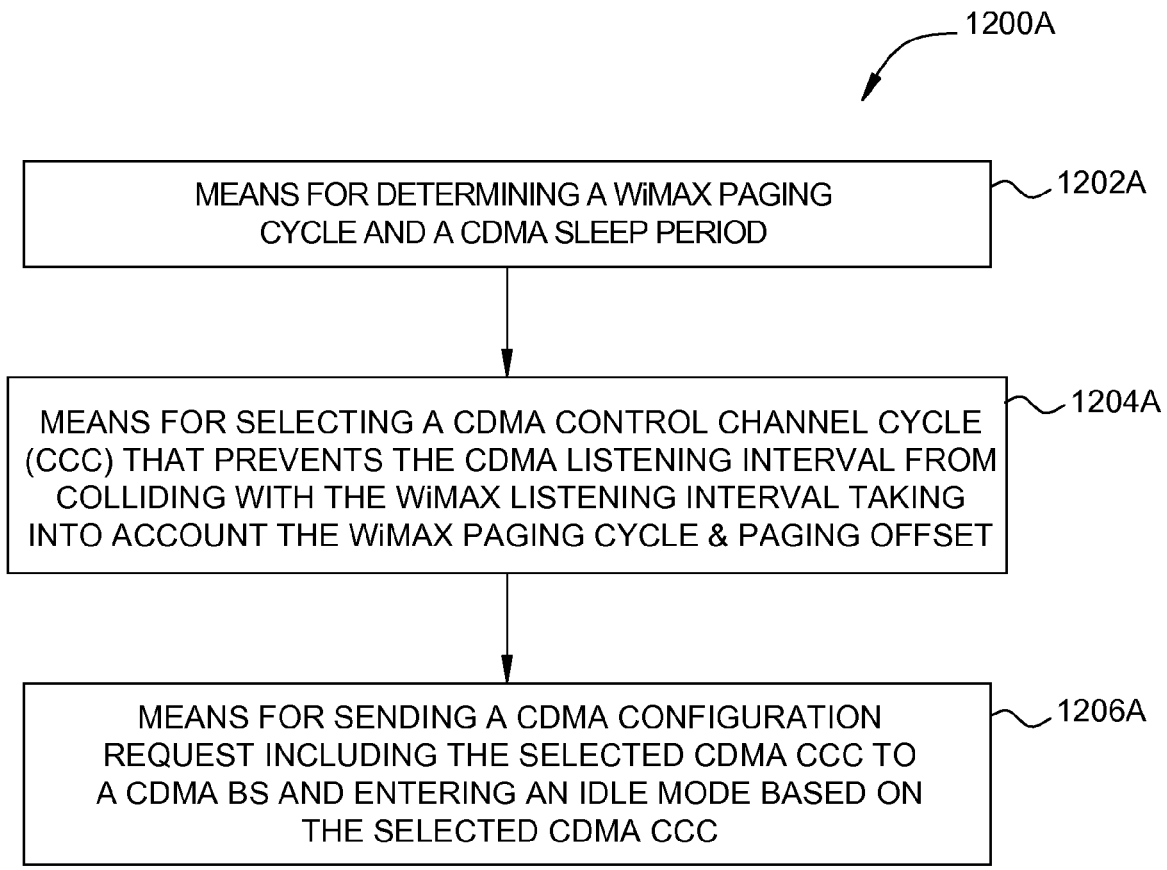
FIG. 12A is a block diagram of means corresponding to the example operations of FIG. 12.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 702-706 illustrated in FIG. 7 correspond to means-plus-function blocks 702A-706A illustrated in FIG. 7A. Similarly, blocks 1202-706 illustrated in FIG. 12 correspond to means-plus-function blocks 1202A-1206A illustrated in FIG. 12A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

What is claimed is:

1. A method for communicating, by a multi-mode mobile station (MS), with first and second networks via first and second radio access technologies (RATs), comprising:
    determining, at the MS, a first set of one or more paging parameters, the first set of one or more paging parameters comprising a paging cycle parameter and a paging offset parameter from a set of paging offset parameters for which a paging interval of the first network does not conflict with a paging interval of the second network;
    communicating the first set of paging parameters from the MS to a base station of the first network in a deregistration request to establish the paging interval of the first network, the deregistration request including a period of the paging cycle parameter, the paging offset parameter, and a bit indicating whether the period of the paging cycle parameter and the paging offset parameter are mandatory; and
    tuning a radio frequency (RF) chain of the MS to decode paging signals in the paging interval from the base station of the first network.

2. The method of claim 1, wherein determining the first set of one or more paging parameters comprises:
    determining a timing difference offset between frames of the first and second networks;
    determining a paging cycle and a paging offset of the second network;
    determining a paging cycle of the first network based, at least in part, on the paging cycle of the second network; and
    determining a paging offset of the first network based, at least in part, on the timing difference offset between frames of the first and second networks and the paging offset of the second network.

3. The method of claim 2, wherein the paging cycle of the first network is an integer multiple of the paging cycle of the second network.

4. The method of claim 1, wherein determining the first set of one or more paging parameters:
    determining a WiMAX paging cycle and a WiMAX paging offset based on parameters of a code division multiple access (CDMA) paging cycle.

5. The method of claim 1, wherein determining the first set of one or more paging parameters:
    selecting a control channel cycle of for a code division multiple access (CDMA) paging cycle based on one or more parameters of a WiMAX paging cycle.

6. An apparatus for communicating, by a multi-mode mobile station (MS), with first and second networks via first and second radio access technologies (RATs), comprising:
    at least one processor configured to:
        determine, at the MS, a first set of one or more paging parameters, the first set of one or more paging parameters comprising a paging cycle parameter and a paging offset parameter from a set of paging offset parameters for which a paging interval of the first network does not conflict with a paging interval of the second network;
        communicate the first set of paging parameters from the MS to a base station of the first network in a deregistration request to establish the paging interval of the first network, the deregistration request including a period of the paging cycle parameter, the paging offset parameter, and a bit indicating whether the period of the paging cycle parameter and the paging offset parameter are mandatory; and
        tune a radio frequency (RF) chain of the MS to decode paging signals in the paging interval from the base station of the first network; and
    a memory coupled to the at least one processor.

7. The apparatus of claim 6, wherein the at least one processor determines the first set of one or more paging parameters at least in part by:
    determining a timing difference offset between frames of the first and second networks; determining a paging cycle and a paging offset of the second network;
    determining a paging cycle of the first network based, at least in part, on the paging cycle of the second network; and
    determining a paging offset of the first network based, at least in part, on the timing difference offset between frames of the first and second networks and the paging offset of the second network.

8. The apparatus of claim 7, wherein the paging cycle of the first network is an integer multiple of the paging cycle of the second network.

9. The apparatus of claim 6, wherein the first set of one or more paging parameters comprise a WiMAX paging cycle and a WiMAX paging offset, and wherein the paging interval of the second network comprises a code division multiple access (CDMA) paging cycle.

10. The apparatus of claim 6, wherein the at least one processor determines the first set of one or more paging parameters at least in part by:
    selecting a control channel cycle of for a code division multiple access (CDMA) paging cycle based on one or more parameters of a WiMAX paging cycle.

11. An apparatus for communicating, by a multi-mode mobile station (MS), with first and second networks via first and second radio access technologies (RATs), comprising:
    means for determining, at the MS, a first set of one or more paging, the first set of one or more paging parameters comprising a paging cycle parameter and a paging offset parameter from a set of paging offset parameters for which a paging interval of the first network does not conflict with a paging interval of the second network;
    means for communicating the first set of paging parameters from the MS to a base station of the first network in a deregistration request to establish the paging interval of the first network, the deregistration request including a period of the paging cycle parameter, the paging offset parameter, and a bit indicating whether the period of the paging cycle parameter and the paging offset parameter are mandatory; and means for tuning a radio frequency (RF) chain of the MS to decode paging signals in the paging interval from the base station of the first network.

12. The apparatus of claim 11, wherein the means for determining the first set of one or more paging parameters comprises:

means for determining a timing difference offset between frames of the first and second networks;

means for determining a paging cycle and a paging offset of the second network;

means for determining a paging cycle of the first network based, at least in part, on the paging cycle of the second network; and means for determining a paging offset of the first network based, at least in part, on the timing difference offset between frames of the first and second networks and the paging offset of the second network.

13. The apparatus of claim 12, wherein the paging cycle of the first network is an integer multiple of the paging cycle of the second network.

14. The apparatus of claim 11, wherein the means for determining the first set of one or more paging parameters comprises:

means for determining a WiMAX paging cycle and a WiMAX paging offset based on parameters of a code division multiple access (CDMA) paging cycle.

15. The apparatus of claim 11, wherein the means for determining the first set of one or more paging parameters comprises:

means for selecting a control channel cycle of for a code division multiple access (CDMA) paging cycle based on one or more parameters of a WiMAX paging cycle.

16. A computer-program product for communicating, by a multi-mode mobile station (MS), with first and second networks via first and second radio access technologies (RATs), comprising a non-transitory computer readable medium having instructions stored thereon, the instructions being executable by one or more processors and the instructions comprising:

instructions for determining, at the MS, a first set of one or more paging parameters, the first set of one or more paging parameters comprising a paging cycle parameter and a paging offset parameter from a set of paging offset parameters for which a paging interval of the first network does not conflict with a paging interval of the second network;

instructions for communicating the first set of paging parameters from the MS to a base station of the first network in a deregistration request to establish the paging interval of the first network, the deregistration request including a period of the paging cycle parameter, the paging offset parameter, and a bit indicating whether the period of the paging cycle parameter and the paging offset parameter are mandatory; and instructions for tuning a radio frequency (RF) chain of the MS to decode paging signals in the paging interval from the base station of the first network.

17. The computer-program product of claim 16, wherein the instructions for determining the first set of one or more paging parameters comprises:

instructions for determining a timing difference offset between frames of the first and second networks;

instructions for determining a paging cycle and a paging offset of the second network;

instructions for determining a paging cycle of the first network based, at least in part, on the paging cycle of the second network; and instructions for determining a paging offset of the first network based, at least in part, on the timing difference offset between frames of the first and second networks and the paging offset of the second network.

18. The computer-program product of claim 17, wherein the paging cycle of the first network is an integer multiple of the paging cycle of the second network.

19. The computer-program product of claim 1, wherein the instructions for determining the first set of one or more paging parameters comprises:

instructions for determining a WiMAX paging cycle and a WiMAX paging offset based on parameters of a code division multiple access (CDMA) paging cycle.

20. The computer-program product of claim 1, wherein the instructions for determining the first set of one or more paging parameters comprises:

instructions for selecting a control channel cycle of for a code division multiple access (CDMA) paging cycle based on one or more parameters of a WiMAX paging cycle.

* * * * *